United States Patent
Inagaki et al.

(10) Patent No.: US 6,738,182 B2
(45) Date of Patent: May 18, 2004

(54) OPTICAL FIBER AMPLIFIER

(75) Inventors: Shinya Inagaki, Kawasaki (JP); Norifumi Shukunami, Sapporo (JP); Manabu Watanabe, Sapporo (JP); Hisashi Takamatsu, Kawasaki (JP); Keiko Sasaki, Kawasaki (JP); Tomoaki Takeyama, Kawasaki (JP); Yasushi Sugaya, Kawasaki (JP); Kaoru Moriya, Kawasaki (JP); Takashi Satou, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/903,579

(22) Filed: Jul. 13, 2001

(65) Prior Publication Data

US 2002/0141045 A1 Oct. 3, 2002

(30) Foreign Application Priority Data

Jan. 31, 2001 (JP) ........................................ 2001-022632

(51) Int. Cl.$^7$ ................................................ H01S 3/00
(52) U.S. Cl. ................................ 359/337.1; 359/341.32
(58) Field of Search .......................... 359/337.1, 337.21, 359/341.1, 341.3, 341.31, 341.32

(56) References Cited

U.S. PATENT DOCUMENTS

| | | | | |
|---|---|---|---|---|
| 5,991,068 A | * | 11/1999 | Massicott et al. ............ | 359/337 |
| 6,233,092 B1 | * | 5/2001 | Flood et al. ................. | 359/134 |
| 6,288,834 B1 | * | 9/2001 | Sugaya et al. ............ | 359/341.1 |
| 6,404,539 B1 | * | 6/2002 | Kotrotsios et al. .......... | 359/188 |
| 6,437,907 B1 | * | 8/2002 | Yoon et al. ............. | 359/341.32 |
| 6,459,526 B1 | * | 10/2002 | Minelly et al. .......... | 359/337.1 |
| 6,501,594 B1 | * | 12/2002 | Hwang et al. ......... | 359/341.32 |
| 2002/0003655 A1 | * | 1/2002 | Park et al. ............... | 359/341.1 |
| 2002/0044344 A1 | * | 4/2002 | Terahara ................... | 359/341.1 |
| 2002/0118445 A1 | * | 8/2002 | Yeniay et al. ............. | 359/341.1 |

FOREIGN PATENT DOCUMENTS

| JP | A-2000-12937 | 1/2000 | ............. H01S/3/10 |
|---|---|---|---|
| JP | A-2000-66137 | 3/2000 | ........... G02B/27/28 |

OTHER PUBLICATIONS

A Letter and Page of a Catalog of LYMYTH, Nov. 27, 2000 (English Translation of a Letter).

* cited by examiner

Primary Examiner—Thomas G. Black
Assistant Examiner—Deandra M. Hughes
(74) Attorney, Agent, or Firm—Staas & Halsey LLP

(57) ABSTRACT

A signal light passes through an isolator, and is coupled by a coupler with a pump light from a pump light source. Then, the signal light passes through an ASE reflection filter, is amplified by an EDF, and is transmitted from an isolator. At this time, an ASE light having a predetermined wavelength among ASE lights that occur within the EDF and proceed to the ASE reflection filter is reflected and again input to the EDF. By setting the predetermined wavelength to a wavelength on the short wavelength side of an amplification band of the EDF, gain deviation occurring on the long wavelength side of the amplification band can be cancelled.

38 Claims, 22 Drawing Sheets

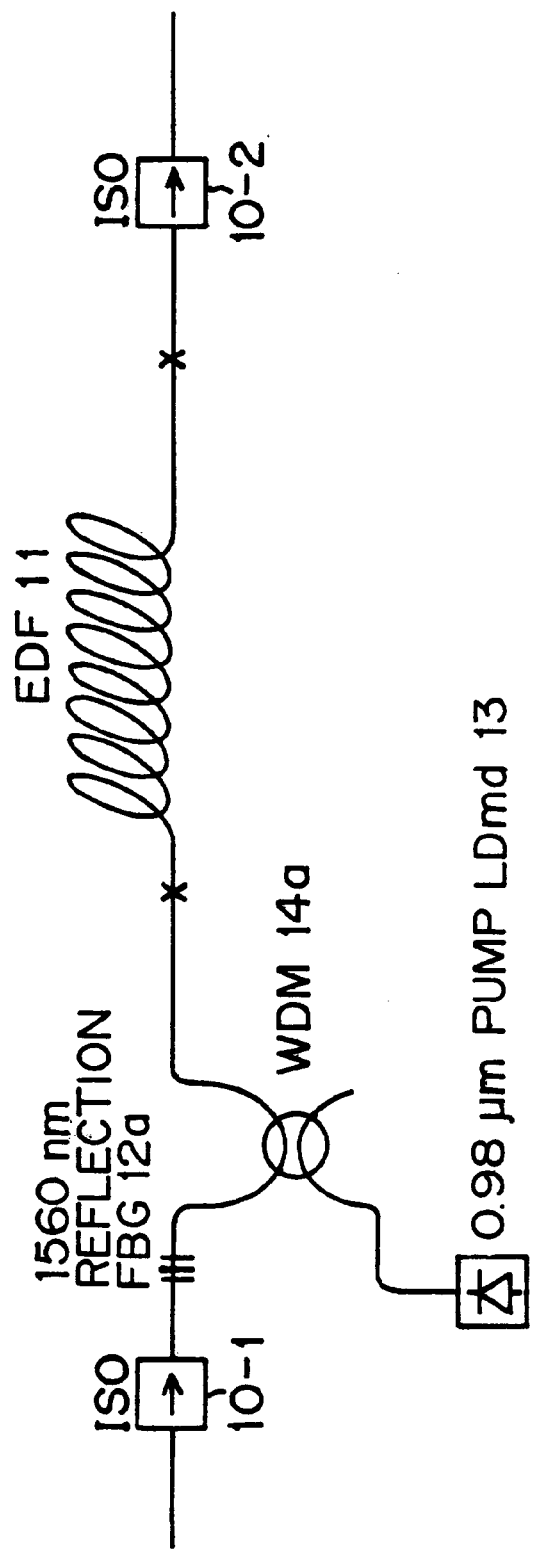
F I G. 14

OPTICAL FIBER AMPLIFIER

BACKGROUND OF THE INVENTION

1. Field of the Invention

The present invention relates to an optical fiber amplifier applied when the capacity and the distance of a WDM transmission system are increased.

2. Description of the Related Art

In recent years, the demand for increasing the amount of information has been sharply increasing with the progress of Internet technologies. Additionally, a further increase in a capacity and flexible network building are required for a trunk line optical transmission system on which the amount of information is concentrated.

In the present situation, a WDM (Wavelength Division Multiplexing) transmission method is the most effective means that meets such a system demand, and the U.S. is currently taking the initiative in commercializing the transmission system.

An amplifier on which a rare-earth element is doped to amplify a light, such as an EDFA (Erbium-Doped Fiber Amplifier), can collectively amplify a wavelength-multiplexed signal light by using its wide gain band. Therefore, this is a key component for implementing a WDM optical transmission system.

It is known that the EDFA can cover not only an amplification band (1530 to 1565 nm) called a conventional band (C-band), which is mainly used so far, but also an amplification band (1570 to 1605 nm) called a long wavelength band (L-band), the coverage of which has been enabled in recent years.

The current EDFA system allows a wavelength-multiplexed signal including signal lights of approximately 200 wavelengths to be amplified in a band into which the C-band and the L-band are combined.

With the EDFA, an inversion population ratio must be selected so that the gain of each wavelength-multiplexed signal light becomes equal in a wavelength band to be used.

FIG. 1 shows the wavelength dependency of the gain coefficient per unit length of an EDF (Erbium-Doped Fiber) when the inversion population ratio is varied.

Namely, the graph of this figure shows the average of the inversion population ratio of the EDF over a predetermined length in the longitudinal direction of the EDF. The characteristic with the smallest gain shown in FIG. 1 indicates the state where a rare-earth element is not pumped (inversion population ratio is 0), whereas the characteristic with the largest gain indicates the state where all the atoms of a rare-earth element are excited (inversion population ratio is 1). Characteristics between them respectively indicate the case where the inversion population ratio is incremented by 0.1.

The following points are known from FIG. 1.
(1) The C-band EDFA is in the neighborhood of the central wavelength (1530 nm) of the emission/absorption of an Er ion. A sufficient gain can be secured with a short EDF.
(2) The L-band EDFA per unit length is small. A longer EDF is required in comparison with the C-band EDFA.

FIG. 2 shows the fundamental configuration of an L-band EDFA for optical amplification.

1 indicates an EDF, 2-1 and 2—2 indicate optical isolators, 3 indicates a wavelength-division multiplexing (WDM) coupler, 4 indicates a semiconductor laser (LD) for pumping, and 5 indicates a transmission line.

A wavelength-division multiplexed signal light supplied from the transmission line 5 is provided to the EDF 1 via the optical isolator 2-1 and the WDM coupler 3. The EDF 1 must be made long so as to provide an L-band signal light with almost the same gain, and to make the gain equal to that of a C-band signal light.

In an optical amplifier of a gain shift type, whose inversion population ratio to obtain a flat gain for a target amplification wavelength band is low, and whose rare-earth element doped fiber length must be made long to obtain a necessary gain, such as an L-band EDFA, amplification must be performed stably and efficiently.

Several results of studying the above described optical amplifier of a gain shift type, such as an L-band EDFA, are described below.

As shown in FIG. 1, the length of an L-band EDF must be made longer than that of a C-band EDF so as to obtain a gain equal to that of the C-band in the L-band.

FIG. 3 shows the inversion population ratio in the longitudinal direction resultant from a simulation where an EDF is forward pumped with a constant pump light source power.

The following two points are known from FIG. 3.
(1) The inversion population ratio of the Er ion of the EDF length required for an L-band EDFA is low in the neighborhood of an output end. This is because the EDF length is long, and the pump light power does not fully reach the output end.
(2) The inversion population ratio of the Er ion of the EDF length required for a C-band EDFA is high throughout the EDF. This is because the EDF length is short, and the pump light source power fully reaches also the output end.

FIG. 4 shows the outputs of respective wavelengths in the longitudinal direction of an EDF, which are resultant from the simulation where signal lights having the same power are positioned at intervals of approximately 0.4 nm, and the 80 wavelengths are multiplexed between 1570 to 1605 nm (within the L-band)

In this figure, the highest characteristic indicates a 1570-nm signal light channel ch1, from which signal channels start to be increased in units of 8 downward, and the lowest characteristic indicates a 1605-nm signal light channel ch 80.

It is known from FIG. 4 that there are significant differences among the respective signal light channels in the power distribution in the longitudinal direction.

Namely, for the L-band EDFA, there are a tendency such that lights on the short wavelength side secure a large gain in the neighborhood of the input end, and decrease in power toward the output end after reaching a maximum value, and a tendency such that lights on the long wavelength side monotonously increase in power from the input end toward the output end.

Namely, it is known from FIGS. 3 and 4 that the wavelength characteristic of a gain significantly changes as the inversion population ratio varies.

Accordingly, a long EDF required for the L-band EDFA is proved to have an effect that a signal light on the long wavelength side in the neighborhood of an output end contributes to optical amplification with energy that absorbs signal light power on the short wavelength side, as is known from the above described tendency of FIG. 3 such that the inversion population ratio decreases in the neighborhood of the output end of the long EDF used for the L-band EDFA, and the output value and the wavelength characteristics in the longitudinal direction in FIG. 4.

Assume that signal lights having arbitrary wavelengths among the 80 signal light channels shown in FIG. 4 are amplified unchanged as being wavelength-multiplexed in the system configuration shown in FIG. 2. Further assume that lights of 2 wavelengths such as a signal channel ch1 on the shortest wavelength side and a signal light channel chX on its longer wavelength side are input to the optical fiber amplifier, and collectively amplified on the condition that the pump light power is constant. In this case, if a comparison is made between the output of the signal light channel chX on the longer wavelength side in the case where the channels are collectively amplified, and the output of the signal light channel chX in the case where the signal light channel ch1 on the shortest wavelength side is dropped, a phenomenon that the power of the signal light channel chX on the longer wavelength side in the case where the signal light channel ch1 on the shortest wavelength side is dropped is sometimes lower, occurs.

FIG. 5 assumes the system having the configuration of FIG. 2 in which an arbitrary number of wavelengths among the 80 channels shown in FIG. 4 are multiplexed, and shows the dependency of the varying output of the signal light channel ch80 on the EDF length in the case where the signal light channel ch1 is driven on the condition that the pump light power is constant, and in the case where the signal light channel ch1 is dropped.

With a predetermined EDF length or longer, the output level of the signal light channel ch80 becomes lower. With the EDF length required for optically amplifying an L-band light, the output level of the signal light channel ch80 becomes lower when the signal light channel ch1 on the shortest wavelength side is dropped under the above described condition.

In the meantime, with the EDF length required for a C-band light, the output level of the signal light channel ch80 becomes not lower but higher.

The above described phenomenon can be explained by the relationship of the energy level of the Er ion within the EDF, and by FIGS. 1 and 3.

FIG. 6 shows the energy level of the Er ion within the EDF for an L-band EDFA.

In this figure, a state transition is made from $^4I_{15/2}$ to $^4I_{11/2}$ by 0.98-$\mu$m pumping, a state transition is made from $^4I_{11/2}$ to $^4I_{13/2}$ by 1.48-$\mu$m pumping, a state transition is made from $^4I_{13/2}$ to $^4I_{15/2}$ by spontaneous emission occurring in a 1.55- to 1.57-$\mu$m band, a state transition is made from $^4I_{13/2}$ to $^4I_{15/2}$ by GSA (Ground State Absorption), and a state transition is made from $^4I_{13/2}$ to $^4I_{15/2}$ by induced emission with an induced light (an L-band signal light) in a 1.55- to 1.61-$\mu$m band.

Viewing the characteristics shown in FIG. 1, the gain coefficient is smaller than 0 in the L-band if the inversion population ratio is lower than 0.3, so that an absorption coefficient is larger than the gain coefficient, and the GSA shown in FIG. 6 exceeds the radiation transition (spontaneous emission, and induced emission). Additionally, the absorption coefficient tends to be larger on the shorter wavelength side.

Furthermore, in FIG. 3, the inversion population ratio is lower than 0.3 at the length exceeding approximately 20 m. Accordingly, a signal light on the long wavelength side is considered to be amplified with the GSA of a signal light on the short wavelength side in the neighborhood of the output end, which exceeds approximately 20 m, in the L-band EDFA.

Normally, the GSA of a signal light wavelength is dominant not in the amplification of a C-band light of a short EDF, but in the neighborhood of the output end of a long EDF for the amplification of an L-band light. Therefore, absorption on the short wavelength side becomes larger as described above. Accordingly, the presence/absence of a channel on the short wavelength side exerts more influence on the amplification of an L-band light.

FIG. 7 assumes the case where lights of arbitrary wavelengths are multiplexed among the 80 signal light channels shown in FIG. 4, and shows a specific example of the power distribution of the channel ch1 on the shortest wavelength side and the channel ch80 on the long wavelength side in the longitudinal direction of an EDF.

In this figure, a pump light input to the EDF is assumed to be a forward pump for a signal light, and the power of the pump is made constant. "a" indicates the output characteristic of the signal light channel ch1 when the signal light channels ch1 and ch80 are optically amplified. "b" indicates the output characteristic of the signal light channel ch80 when the signal light channels ch1 and ch80 are optically amplified. "c" indicates the output characteristic of the signal light channel ch80 when only the signal light channel ch80 is optically amplified.

As shown in FIG. 7, a phenomenon that the signal light channel ch80 is significantly attenuated at the output end at the time of the amplification of only the signal light channel ch80, but the gain of the ch80 at the time of the amplification of the two wavelengths is larger, even with the same pump light power, than the gain at the time of the amplification of only one wavelength, occurs.

Even if feedback control works on the pump light, for example, to make the gain or the output level constant, the output of the signal light channel ch80 becomes transiently low, and an error can possibly occur instantaneously in the signal light channel ch80 at a receiving end due to the above described phenomenon, if the signal light channel ch1 is blocked by any trouble, etc. when the signal optical channels ch1 and ch80 are used. Furthermore, this phenomenon is considered to occur not only when an Er-doped fiber optical amplifier for an L-band is used, but also when a relatively long fiber, such as a Tm-doped fluoride fiber optical amplifier made by decreasing the inversion population coefficient, and by making the fiber length longer to obtain a gain (a gain shift type similar to an EDFA), is used.

SUMMARY OF THE INVENTION

It is an object of the present invention to provide an optical fiber amplifier that does not deteriorate an amplification characteristic on a long wavelength side even if a signal on a short wavelength side is disconnected in a wavelength-multiplexing amplifier.

An optical fiber amplifier according to the present invention comprises: an amplifying unit, which is doped with a rare-earth element, amplifying a signal light; a pump light source unit supplying optical energy for amplifying the signal light; and an ASE returning unit returning a light having a wavelength that is longer than a wavelength with which an ASE light occurs with a maximum efficiency, and shorter than an amplification band among ASE lights occurring when the signal light is amplified.

According to the present invention, optical energy is supplied to the amplifying unit by returning an ASE light to the amplifying unit, and used to amplify a signal light on the long wavelength side of a wavelength band to be amplified. As a result, an optical fiber amplifier having a stable amplification characteristic can be provided without deteriorating the amplification gain of the signal light having a long wavelength, even if a signal light having a short wavelength within the amplification band is instantaneously disconnected.

BRIEF DESCRIPTION OF THE DRAWINGS

FIG. 14 shows the configuration of a second preferred embodiment according to the present invention;

DESCRIPTION OF THE PREFERRED EMBODIMENTS

The above described phenomenon does not occur if the EDF is made not to absorb the optical energy of a signal light on the short wavelength side in the neighborhood of the input end in the longitudinal direction. However, this is difficult because of the characteristics of the EDF. Rather, pump light energy may be supplied to a light that can be absorbed easier than a signal light on the short wavelength side.

The present invention focuses on the fact that absorption of pump light power is consumed by amplifying an ASE light (Amplified Spontaneous Emission light: noise that exists in an amplification operation of an EDF, and is further amplified), which is output backward to the EDF and reflected at its input end.

Figure 1:
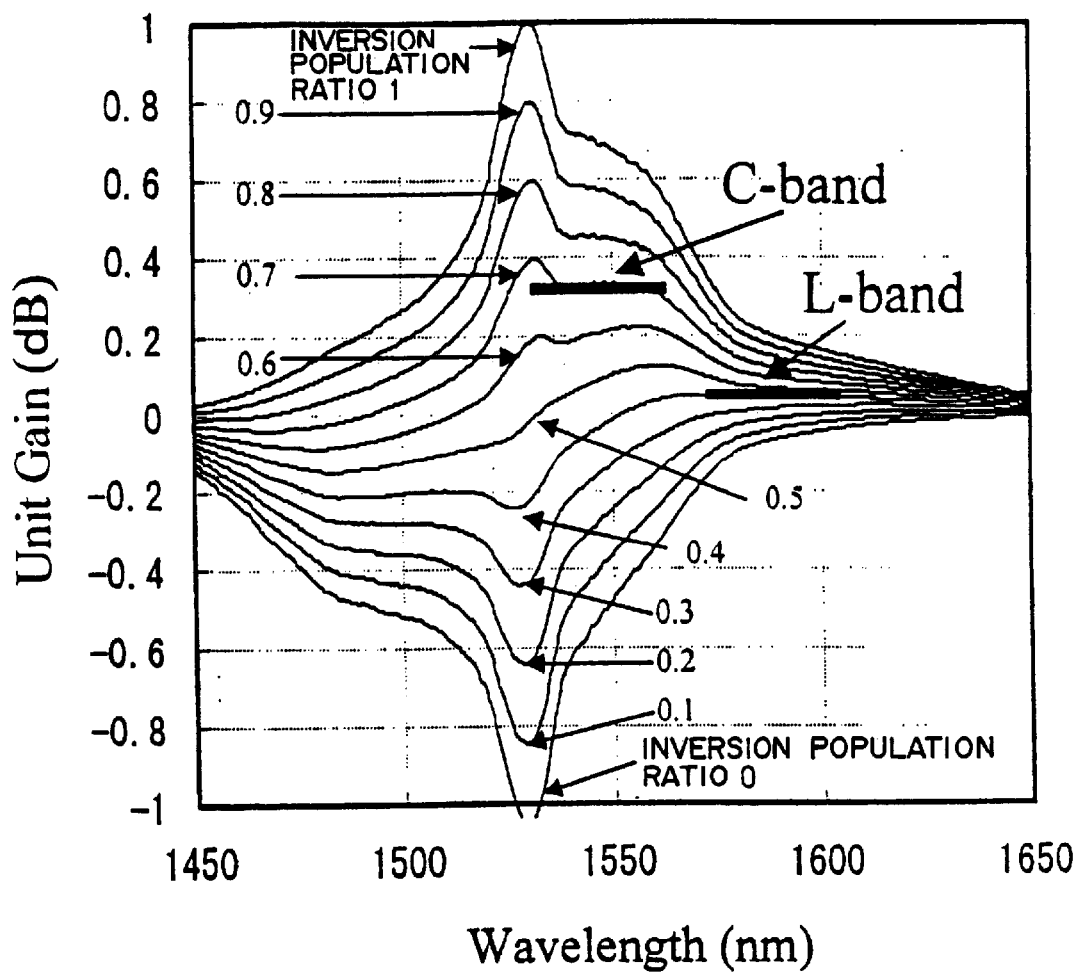
FIG. 1 shows the wavelength dependency of a gain coefficient per unit length of an Erbium-doped fiber (EDF) in the case where an inversion population ratio is changed.
Figure 2:
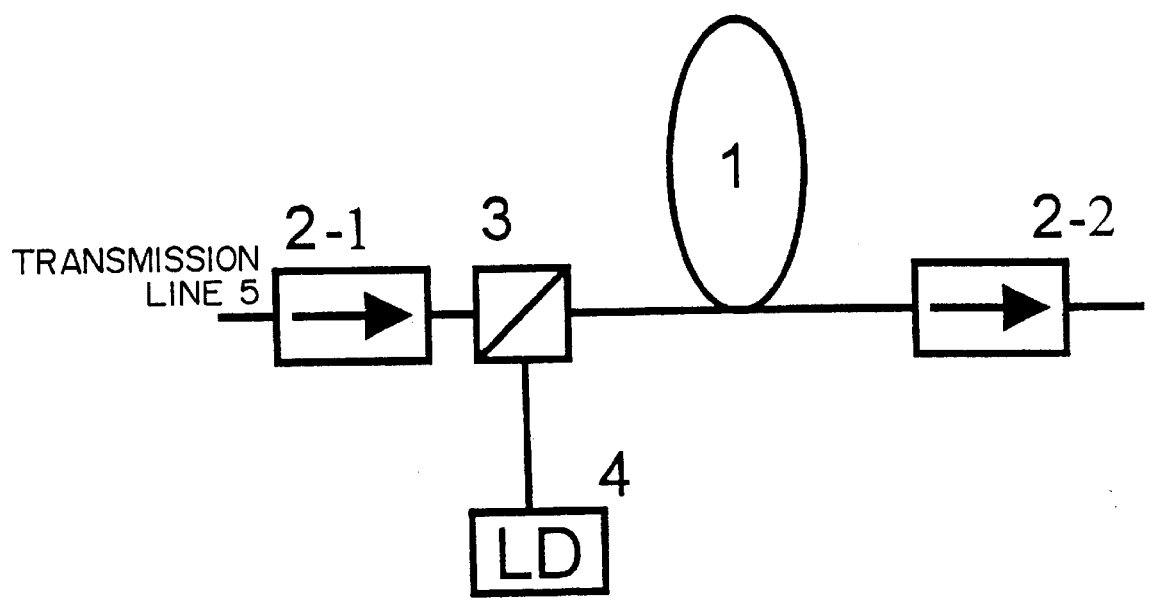
FIG. 2 shows the fundamental configuration of an EDFA for amplifying an L-band light.
Figure 3:
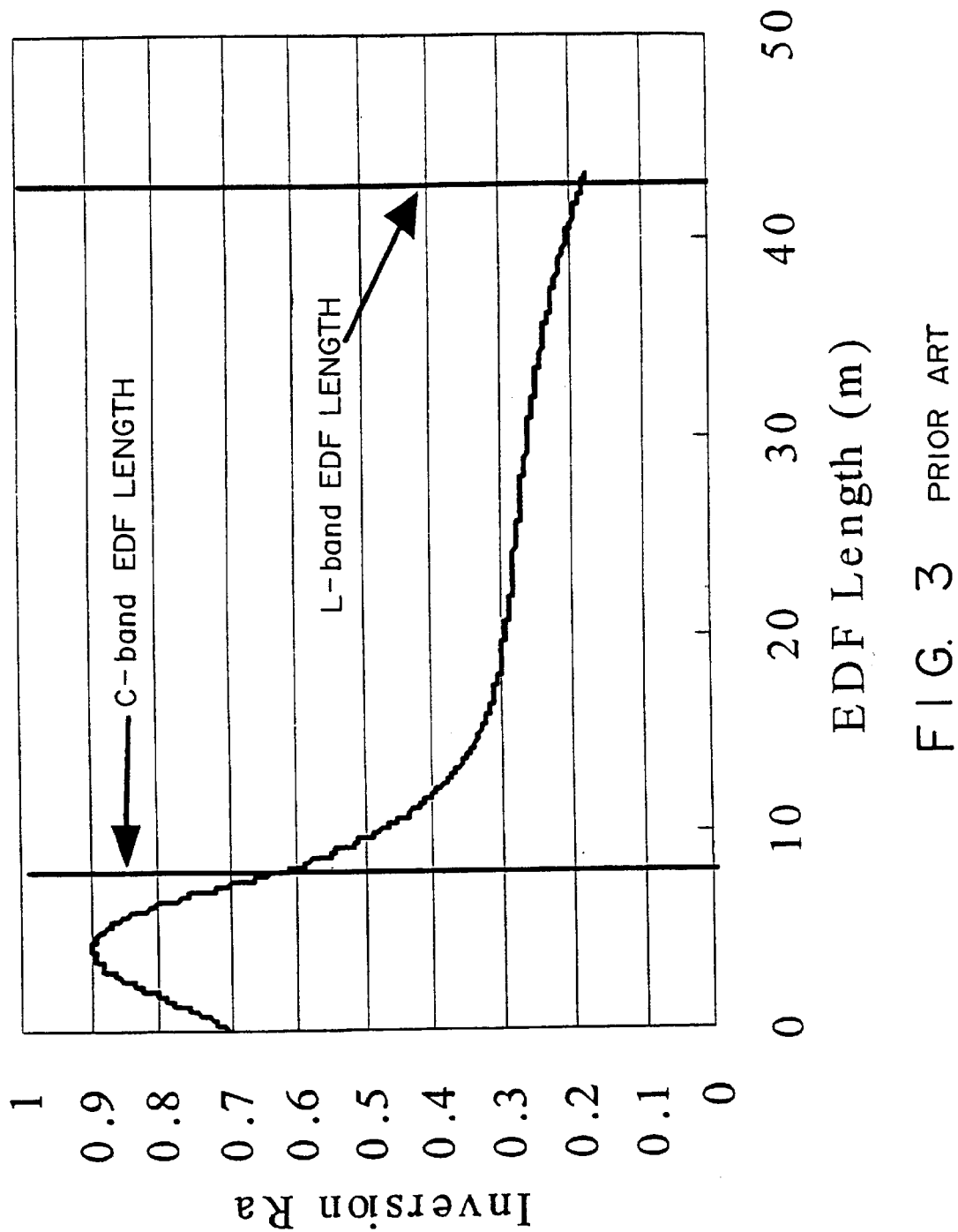
FIG. 3 shows the inversion population ratio in a longitudinal direction in a simulation result in the case where an EDF is forward pumped with constant pump light source power.
Figure 4:
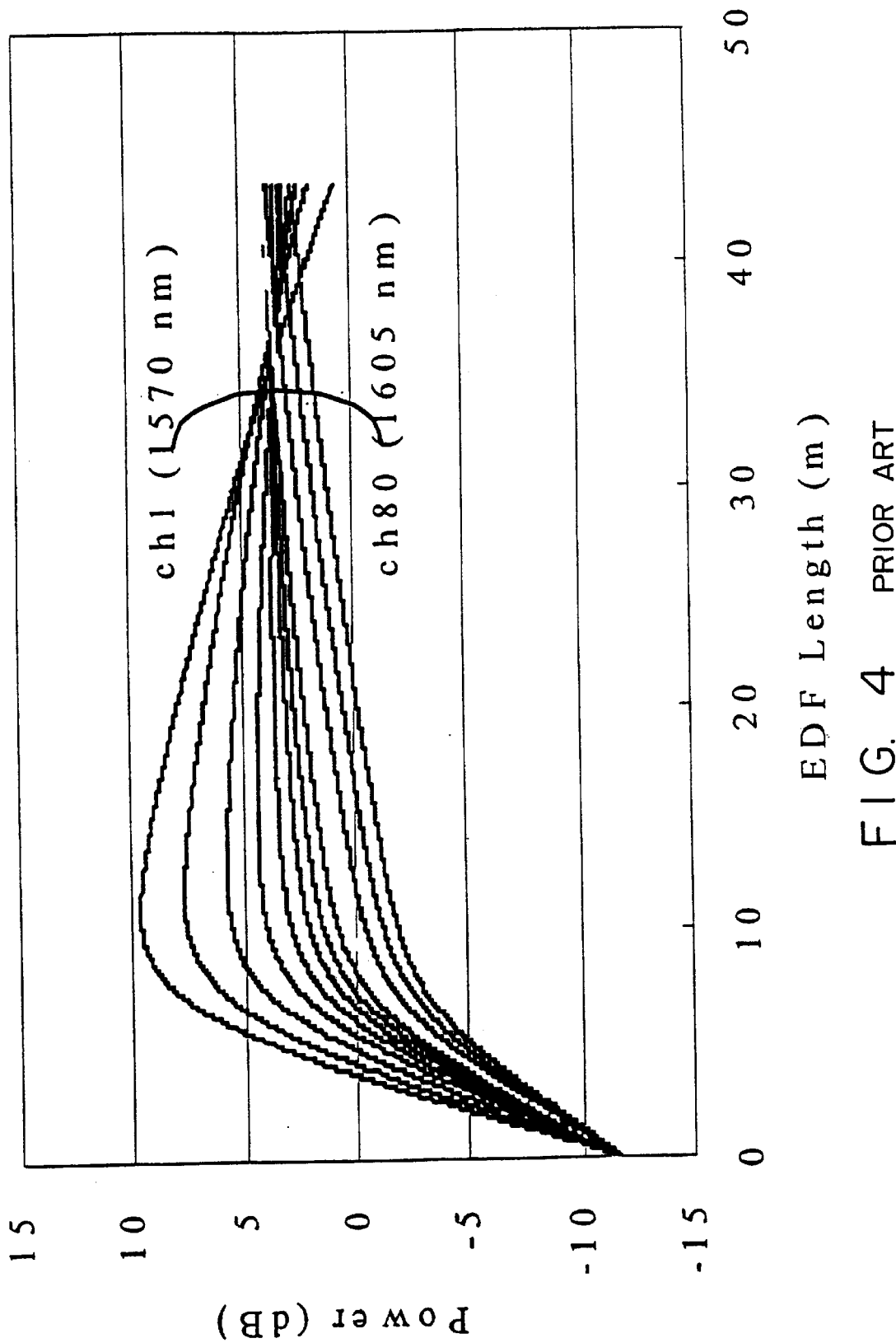
FIG. 4 shows the outputs of respective wavelengths in the longitudinal direction of an EDF in a simulation result in the case where signal lights having the same power are positioned at intervals of approximately 0.4 nm, and the 80 wavelengths are multiplexed between 1570 to 1605 nm (within the L-band)
Figure 5:
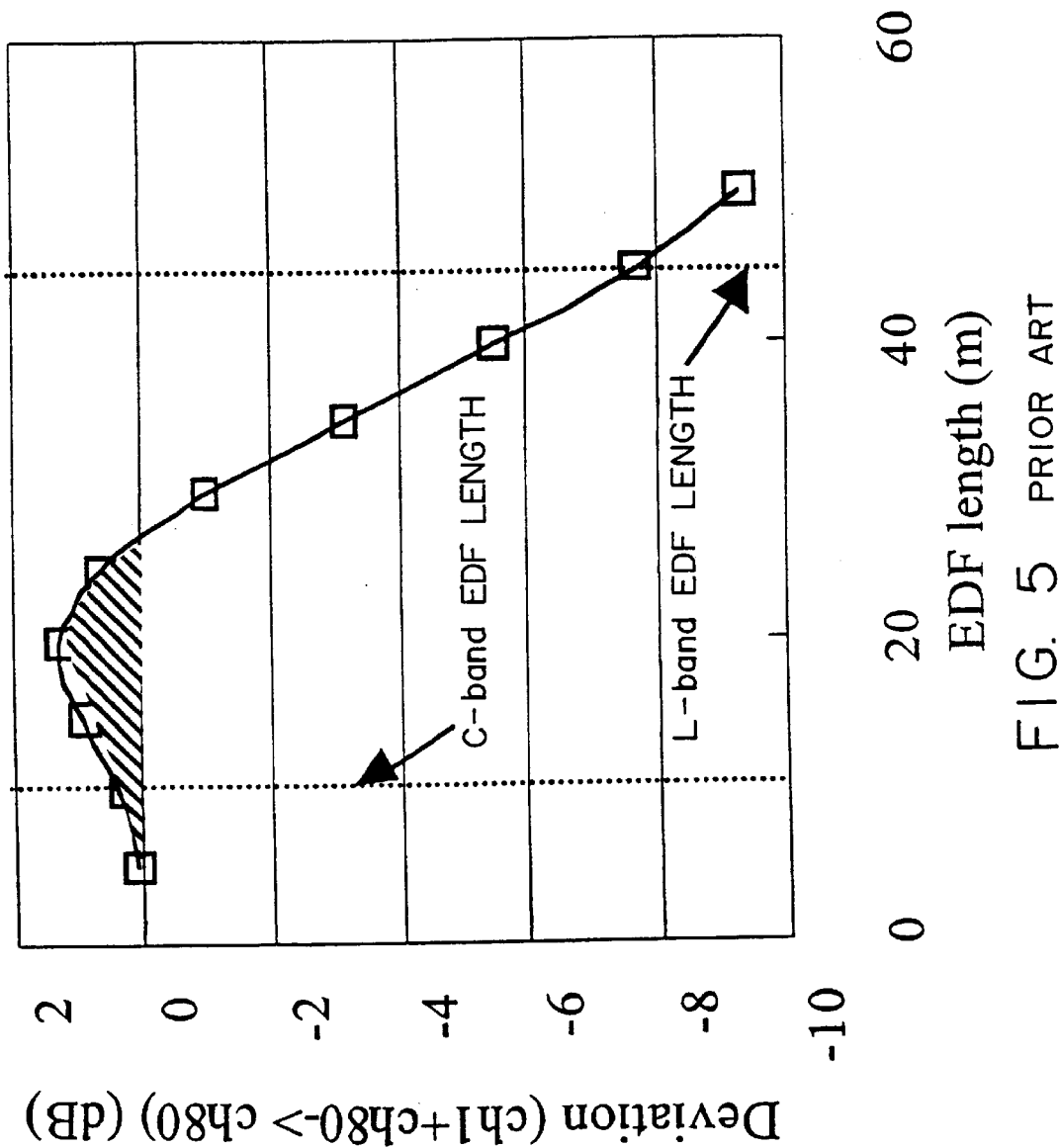
FIG. 5 assumes the system having the configuration of FIG. 2 in which an arbitrary number of wavelengths among the 80 channels shown in FIG. 4 are multiplexed, and shows the dependency of the varying output of the signal light channel ch80 on the EDF length in the case where the signal light channel ch1 is driven on the condition that the pump light power is constant, and in the case where the signal light channel ch1 is dropped.
Figure 6:
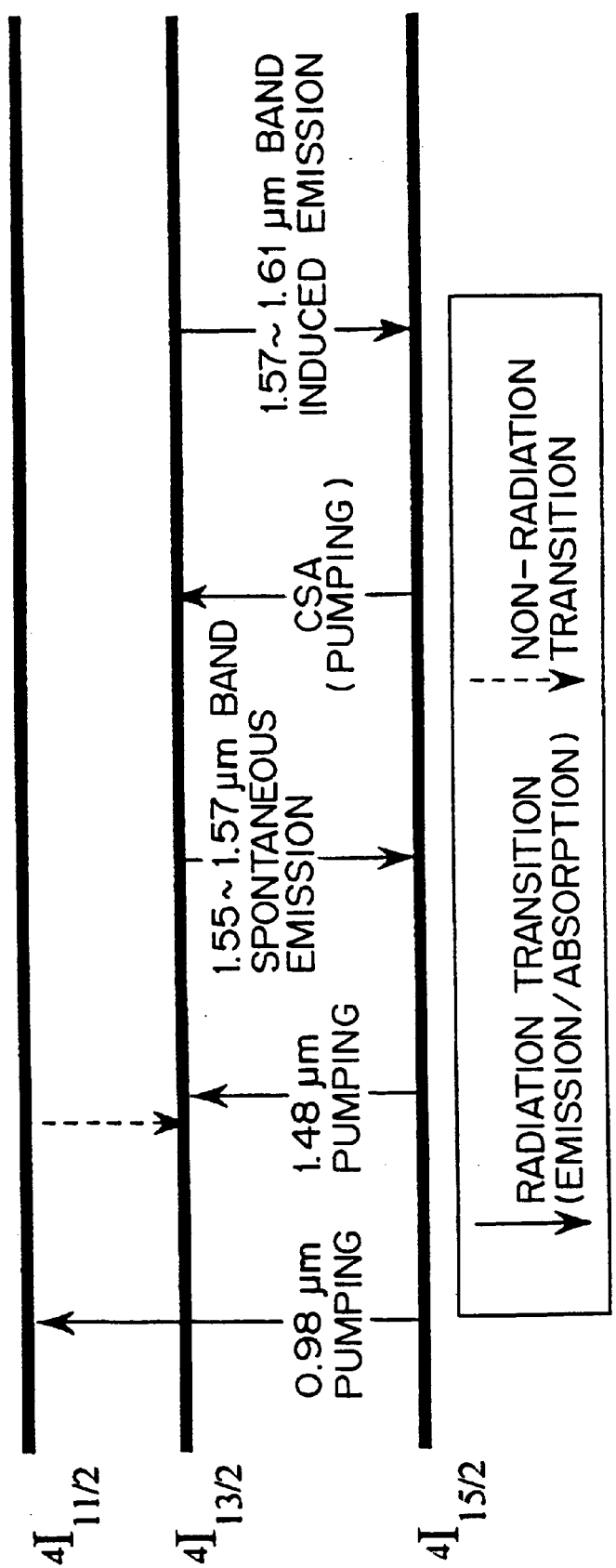
FIG. 6 shows the energy level of an Er ion within an EDF for an L-band EDFA.
Figure 7:
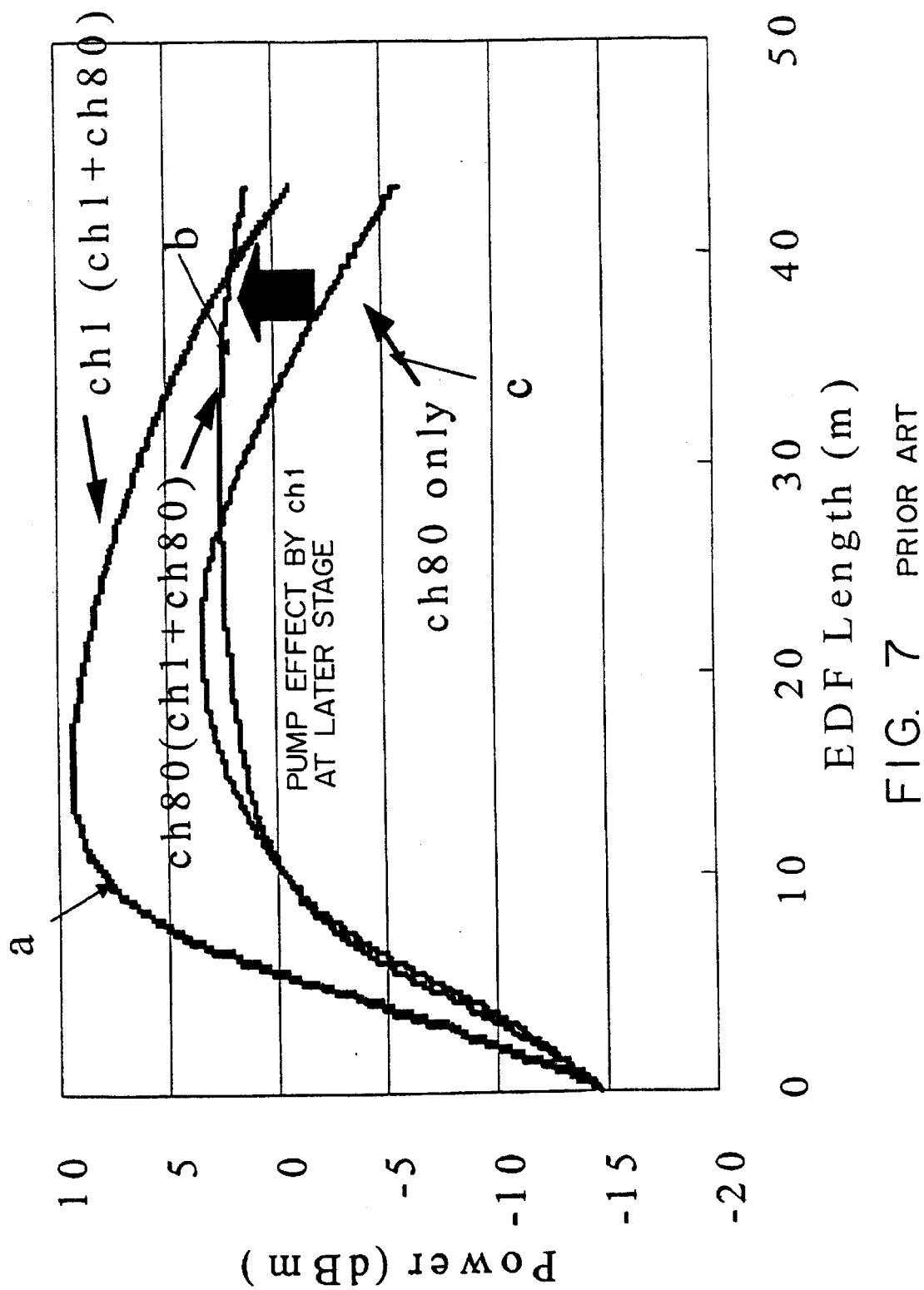
FIG. 7 assumes the case where lights of arbitrary wavelengths are multiplexed among the 80 signal light channels shown in FIG. 4, and shows a specific example of the power distribution of the channel ch1 on the shortest wavelength side and the channel ch80 on the long wavelength side in the longitudinal direction of an EDF.
Figure 8:
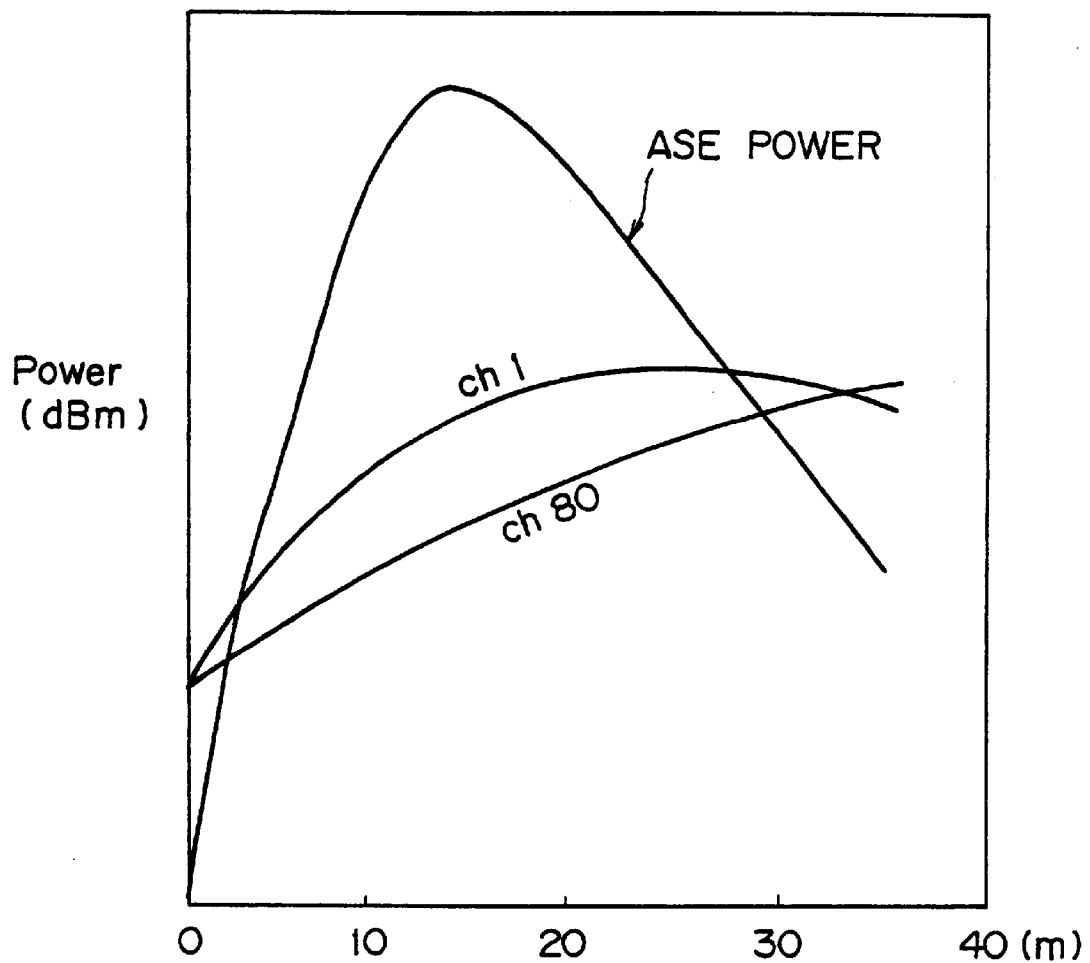
FIG. 8 explains the principle of the present invention.

FIG. 8 explains the principle of the present invention.

Figure 9:
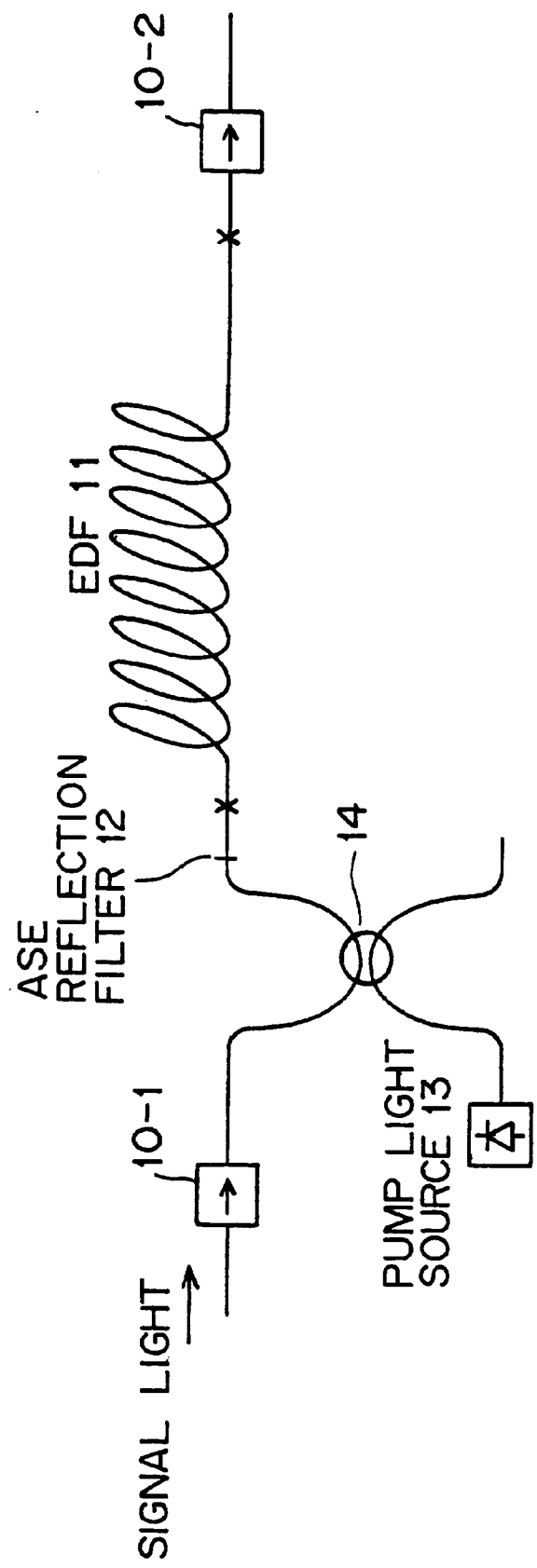
FIG. 9 shows the principle of a preferred embodiment according to the present invention.

FIG. 9 shows the principle of a preferred embodiment according to the present invention.

In FIG. 9, an isolator 10-1 is arranged at an entry of a signal light. A signal light which passes through the isolator 10-1 is coupled by a coupler 14 with a pump light from a pump light source 13. The coupled light passes through an ASE reflection filter 12, and enters an EDF 11. The signal light is amplified with optical power given by the pump light within the EDF 11. The signal light then passes through an isolator 10-2, and is transmitted. In the meantime, an ASE occurs within the EDF 11, and is emitted both to the entry and the exit of the EDF 11. In this preferred embodiment, an ASE light having a wavelength which is explained below among ASEs emitted to the entry of the EDF 11 is reflected by the ASE reflection filter 12, and again input to the EDF 11.

As the ASE reflection filter 12, a reflection film that can select and reflect a particular wavelength, a fiber grating, etc. are available.

Conventionally, there is no increase in ASE power, and a power increase concentrates on the ch1. In contrast, there is an increase in reflected ASE power according to the present invention. Accordingly, the phenomenon, which conventionally occurs on the output side of the ch1, disappears. Namely, the pump effect of the ch1 for the ch80 disappears, whereby the level of the ch80 is not lowered even when the ch1 is dropped. Furthermore, according to the present invention, to ensure this effect, the wavelength of the reflection filter arranged on the input side so as to reflect an ASE light is limited to a wavelength with a large gain, and an ASE light is selectively increased, leading to an increase in the gain efficiency of the EDF.

Figure 10:
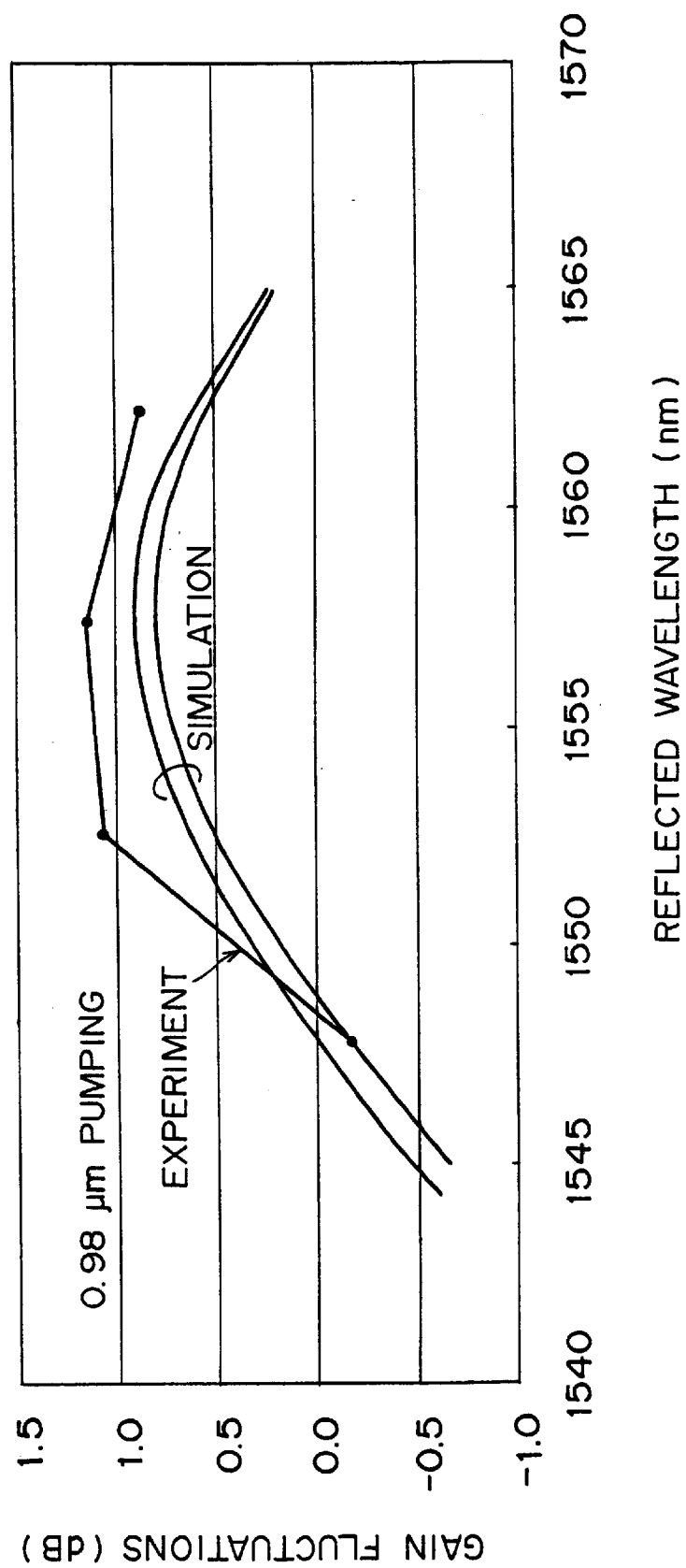
FIG. 10 plots gain fluctuations in simulation and experiment results with reference to a reflected wavelength in the case where an ASE is reflected with 0.98-$\mu$m pumping.

FIG. 10 plots gain fluctuations in simulation and experiment results with reference to a reflected wavelength in the case where an ASE is reflected with 0.98-$\mu$m pumping.

Figure 11:
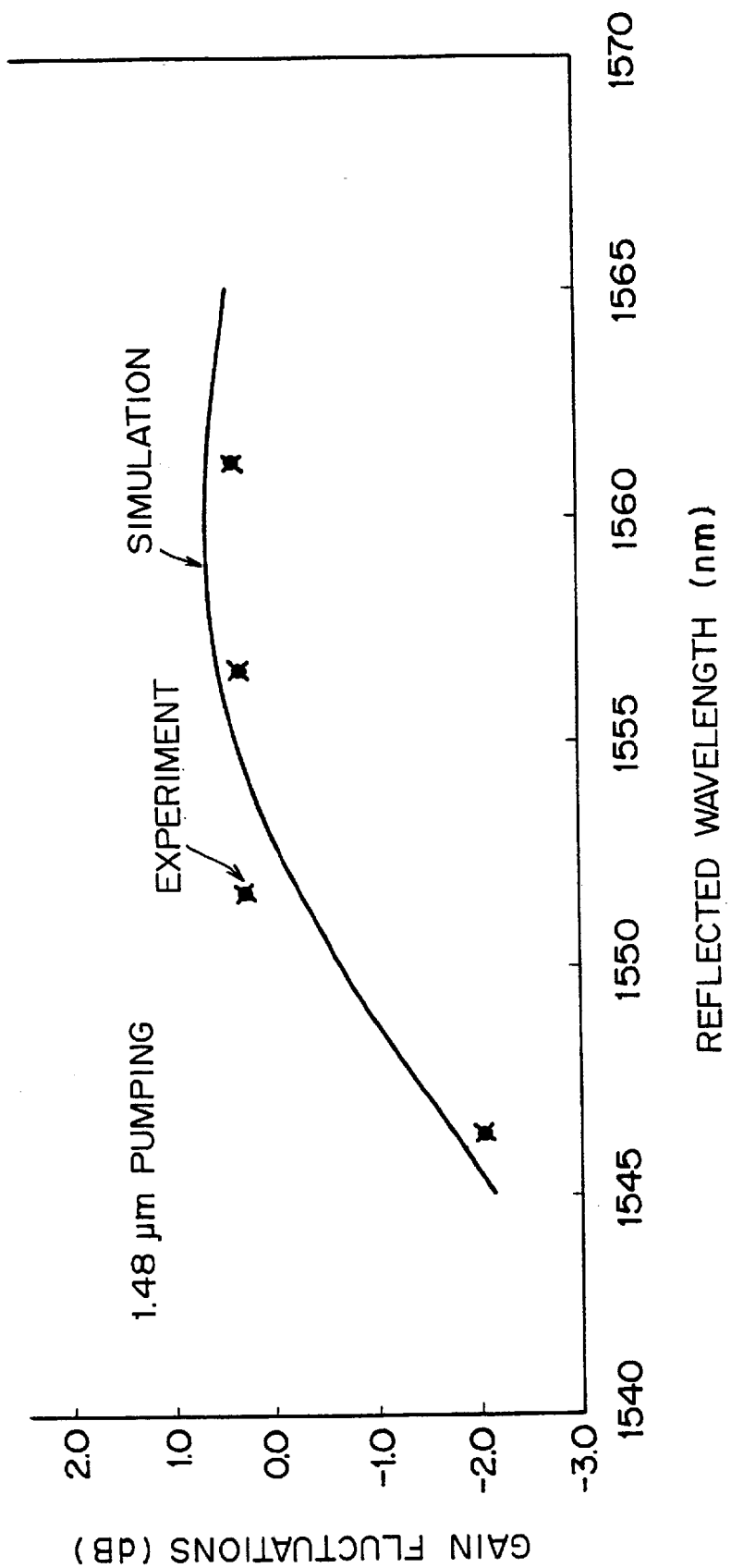
FIG. 11 plots gain fluctuations in simulation and experiment results with reference to a reflected wavelength in the case where an ASE is reflected with 1.48-$\mu$m pumping.

FIG. 11 plots gain fluctuations in simulation and experiment results with reference to a reflected wavelength in the case where an ASE is reflected with 1.48-$\mu$m pumping.

Figure 12:
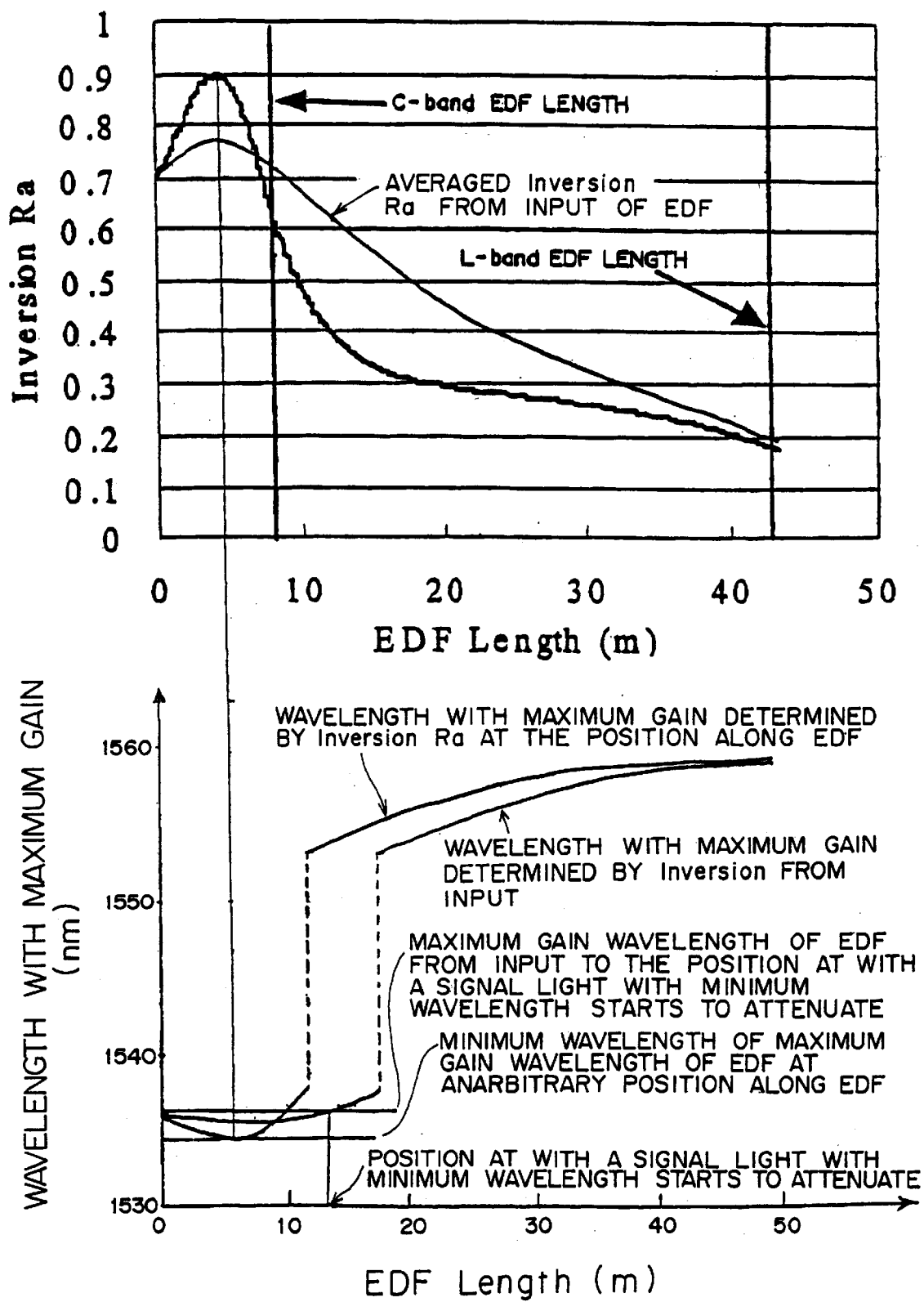
FIG. 12 explains a band used to amplify an optical signal in the present invention.

FIG. 12 explains a band used to amplify an optical signal in the present invention.

Both of the plots show that the gain fluctuations given by a reflected ASE on the long wavelength side of the L-band varies with a change in the reflected wavelength. Especially, these results prove that the gain fluctuations are large in a particular wavelength band. Accordingly, the gain of a signal light on the long wavelength side of the L-band can be efficiently controlled by setting the reflected wavelength to a wavelength within this band.

As a result of verifying the relationship between the reflected wavelength and the gain with the simulation and the actual measurements, the efficiency can be improved by setting the reflected wavelength of an ASE light to a wavelength equal to or longer than approximately 1545 nm, desirably, to a wavelength equal to or shorter than 1560 nm (amplification band: a wavelength that is not longer than the shortest wavelength signal light of the L-band in this case). (In order to increase the power of a reflected ASE, a lower limit of the wavelength of a reflected ASE is set to a minimum wavelength in the wavelength range in which the EDF has a local maximum gain. Preferably, a lower limit of the wavelength of the reflected ASE is set at the wavelength with a maximum gain in a range from input of the EDF to the position along the EDF at which a signal light with a shortest wavelength starts to attenuate. See FIG. 12.) Additionally, it is desirable that the signal wavelength of the L-band is equal to or longer than 1570 nm.

In FIG. 12, the top figure shows a graph which indicates the inversion ratio at the position along the EDF and a graph which indicates the averaged inversion ratio from input of the EDF to the position along the EDF. The bottm figure of FIG. 12 shows a wavelength with a maximum gain determined by the inversion ratio at the position along the EDF and the wavelength with the maximum gain determined by the averaged inversion ratio from input of EDF to the position along the EDF. From these figures, it is apparent that the wavelength with the maximum gain differs for a wavelength determined by an averaged inversion ratio and that determined by an inversion ratio at a position along the EDF. Therefore, there is an option to determine a minimum wavelength of a band used in the present invention according to the above difference. In the present invention, the minimum wavelength is not limited to either of the above wavelengths, but can be either of the above wavelengths.

In the above described case, ASE power fluctuates by inputting a reflected light. This is because the reflected light is further reflected by Rayleigh scattering, which produces laser oscillation. However, the power of the laser oscillation light fluctuates, because the reflected light scatters due to Rayleigh scattering. Therefore, the amplification state of the ASE light in the longitudinal direction of the EDF is expected to become unstable. It seems effective that a laser resonator is formed within the EDF to stabilize the reflected light fluctuated by Rayleigh scattering, which causes the instability.

A preferred embodiment to which the present invention is applied is described below.

Specifications of the EDF, which are the premise of the preferred embodiment, are described below.

| Item | value |
|---|---|
| Er density (ppm) | 1000 |
| MFD ($\mu$m) | 5 |
| diameter off Er-doping ($\mu$m) | 3 |
| cut-off wavelength | 0.9 |

Figure 13:
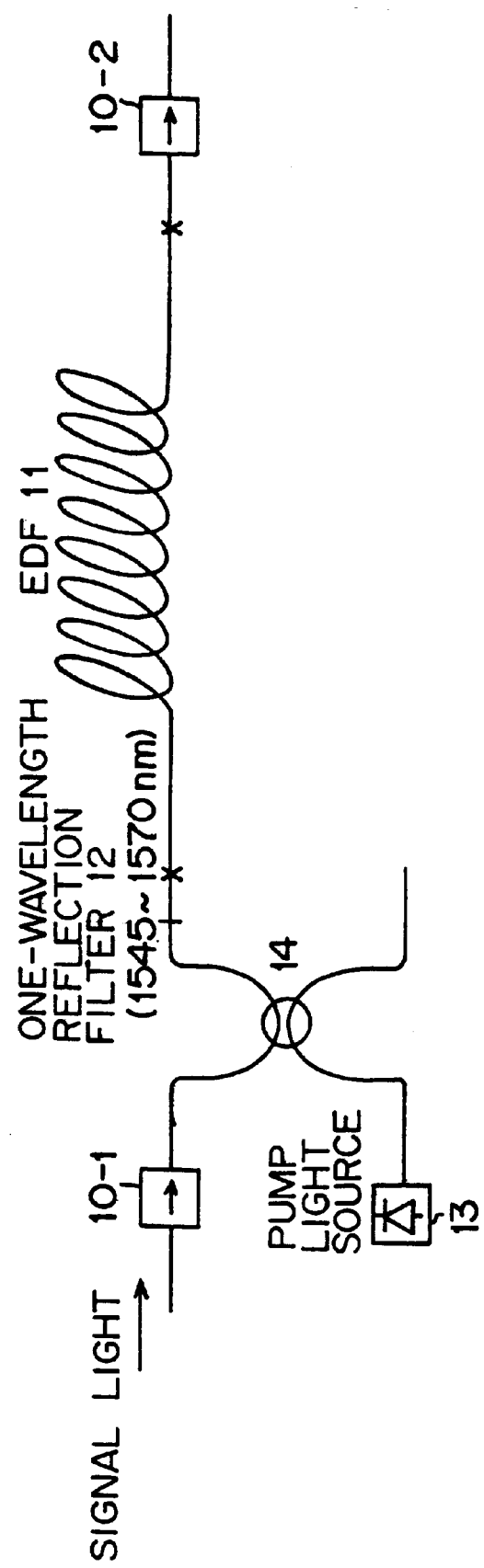
FIG. 13 shows the configuration of a first preferred embodiment according to the present invention.

FIG. 13 shows the configuration of a first preferred embodiment according to the present invention.

In this figure, after passing through an isolator 10-1, a signal light is coupled by a coupler 14 with a pump light from a pump light source 13. The light then passes through a one-wavelength reflection filter 12, and enters an EDF 11. The signal light is amplified by the EDF 11, passes through an isolator 10-2, and is transmitted. Here, the one-wavelength reflection filter 12 for selecting and reflecting an ASE light is arranged between the coupler 14 and the EDF 11. The ASE light reflected by the one-wavelength reflection filter 12 is input to the EDF 11. It is desirable that the reflected ASE light has a wavelength between 1545 to 1575 nm. In this way, the signal light on the long wavelength side of the L-band absorbs the optical energy from the reflected ASE light, so that the amplification gain of the signal light does not decrease even if a signal on the short wavelength side is disconnected. Accordingly, the signal light on the long wavelength side is desirably amplified and transmitted.

FIG. 14 shows the configuration of a second preferred embodiment according to the present invention.

In this figure, the same constituent elements as those shown in FIG. 13 are denoted with the same reference numerals, and their explanations are omitted.

If a 45-m EDF is pumped with a 0.98-$\mu$m pump LDmd, the power of the pump light required to obtain the following signal light input/output power is as follows.

signal light wavelengths:
two wavelengths such as 1570 nm and 1583 nm
signal light input/output power:
—13 dBm/1 dBm
required pump power:
50 mW if a 1560-nm reflection FBG is inserted in an input side
80 mW if the 1560-nm reflection FGS is not inserted in the input side An input signal passes through an isolator 10-1, and also passes through an FBG (Fiber Bragg Grating) 12a. The FBG 12a is intended to reflect a 1560-nm ASE light. A pump light source 13 oscillates with a 0.98-$\mu$m light as a pump light. A WDM coupler 14a is used as a coupler in this preferred embodiment.

As described above, the FBG 12a may be arranged between the isolator 10-1 and the WDM coupler 14a.

Figure 15:
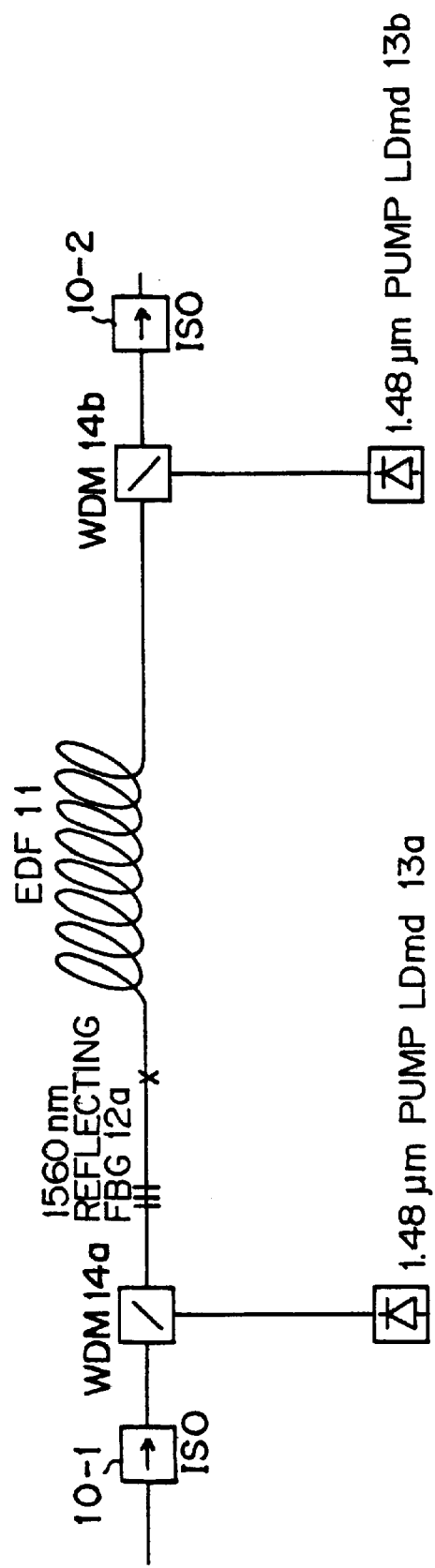
FIG. 15 shows the configuration of a third preferred embodiment according to the present invention.

FIG. 15 shows the configuration of a third preferred embodiment according to the present invention.

When a 65-m EDF is pumped with a 1.48-$\mu$m pump LD md from forward and backward, the power of the pump light required to obtain the following signal light input/output power is as follows.

signal light wavelengths:
two wavelengths such as 1570 nm and 1583 nm
signal light input/output power:
–13 dBm/ch, 0 dBm/ch
required pump power:
42 mW if a 1560-nm reflection FBG is inserted in an input side
43 mW if the 1560-nm reflection FBG is not inserted in the input side An input light passes through an isolator 10-1, and is coupled by a WDM coupler 14a with a 1.48-nm light from a pump light source 13a. The coupled light then passes through an FBG 12a, is input to an EDF 11, and amplified. In this case, since also the backward pumping is used, a 1.48-$\mu$m light from a pump light source 13b is also input to the EDF 11 via a WDM coupler 14b. The amplified signal light passes through the WDM coupler 14b and an isolator 10-2, and is transmitted.

The FBG 12a reflects an ASE light having a 1560-nm wavelength among ASE lights from the EDF 11, and inputs the reflected light to the EDF 11. As a result, the above described effect can be obtained, so that the gain fluctuations of a signal light on the long wavelength side of the L-band, which are caused by an instantaneous disconnection of a signal on the short wavelength side, can be prevented.

As described above, the level of a reflected ASE light becomes unstable in the preferred embodiment stated earlier, and also the gain given to a signal light on the long wavelength side of the L-band also becomes unstable. An example of laser oscillation within the EDF to stabilize a reflected light is therefore provided below.

Figure 16:
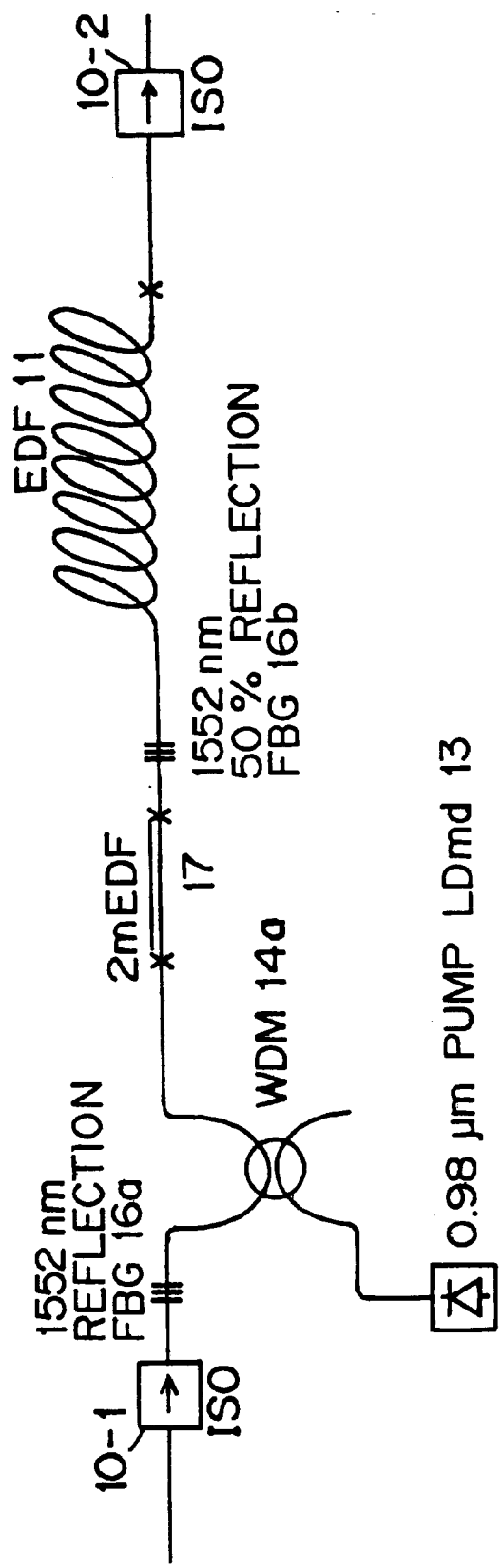
FIG. 16 shows the configuration of a fourth preferred embodiment according to the present invention.

FIG. 16 shows the configuration of a fourth preferred embodiment according to the present invention.

To stabilize the operations in the above described preferred embodiment, a 50% reflection FBG 16b is connected to the neighborhood of the input end of an EDF 11. An ASE light is resonated between the two reflection FBGs 16a and 16b, so that the power of the ASE light input to a backward EDF 17 is stabilized. With this method, it can be known that an output spectrum becomes stable.

Namely, this preferred embodiment has a difference from the above described preferred embodiment in a point that the FBG 16b and the EDF 17 are arranged. The EDF 17 is configured to amplify a 1552-nm light being a reflected light of the FBGs 16a and 16b. Its length is selected, for example, as 2 m. As this length, a designer must suitably select a length required for resonation.

Because the rest of the configuration is the same as the above described preferred embodiment, its explanation is omitted.

Figure 17:
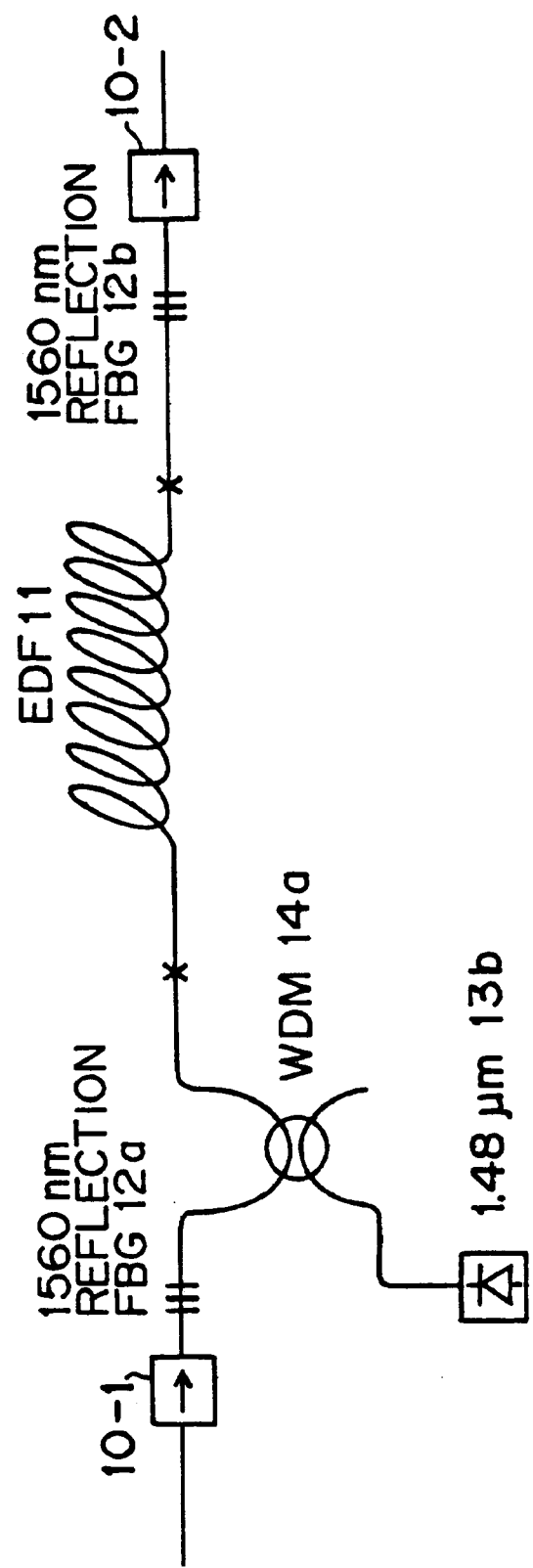
FIG. 17 shows the configuration of a fifth preferred embodiment according to the present invention.

FIG. 17 shows the configuration of a fifth preferred embodiment according to the present invention.

As another means for stabilizing a reflected ASE light, 100% reflection FBGs 12a and 12b are connected to both of the ends of an EDF. As a result, the reflected ASE light is resonated between the two reflection FBGs, and an internal oscillation light is stabilized. With this method, an output spectrum becomes stable.

For the rest of the configuration, its explanation is omitted.

Figure 18:
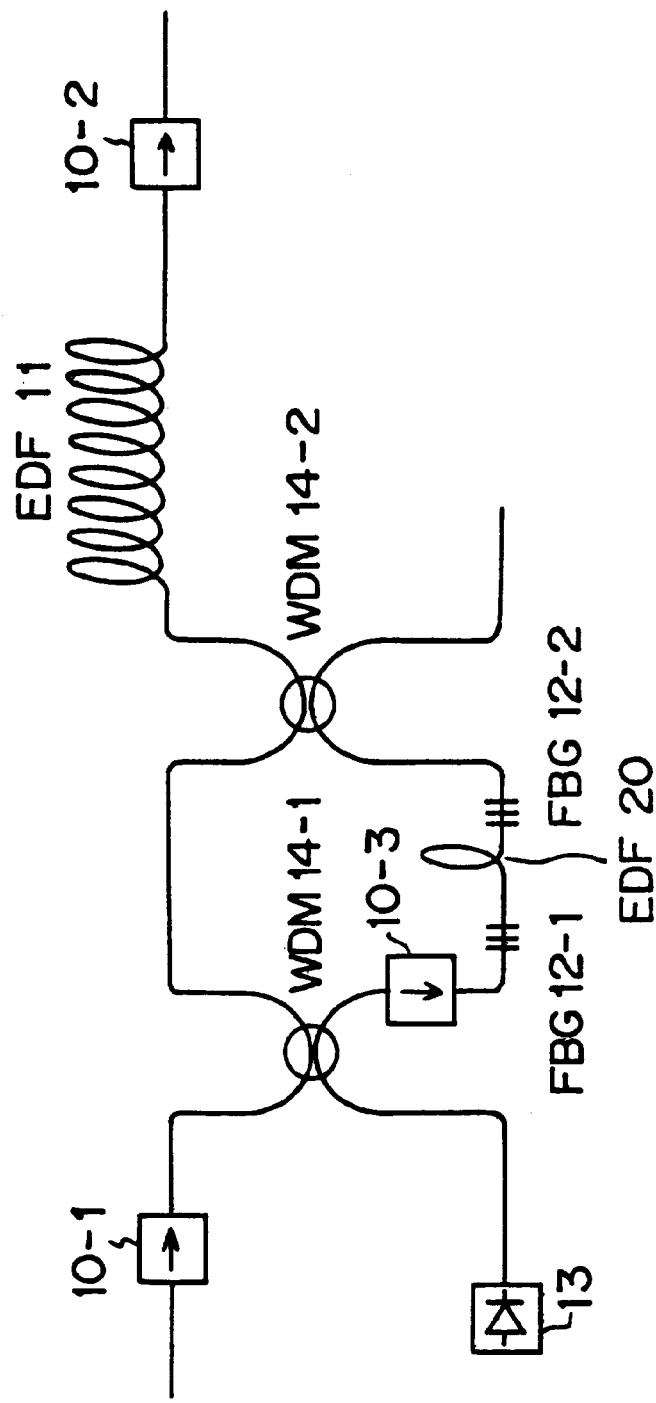
FIG. 18 shows the configuration of a sixth preferred embodiment according to the present invention.

FIG. 18 shows the configuration of a sixth preferred embodiment according to the present invention.

Here, WDM couplers 14-1 and 14-2 are prepared, and a laser resonator, which is composed of FBGs 12-1 and 12-2, and an EDF 20, is formed as a system different from the path along which a signal light passes. After passing through an isolator 10-1, an input signal light is coupled by the WDM coupler 14-1 with a pump light from a pump light source 13. Then, the signal light then passes through the WDM coupler 14-2, is amplified by an EDF 11, passes through an isolator 10-2, and is transmitted. An ASE light from the EDF 11 is led from the WDM coupler 14-2 to the EDF 20, and resonated by the laser resonator formed here. The ASE light again passes through the WDM coupler 14-2, and is input to the EDF 11. In this way, the above described effect can be obtained while stabilizing the reflected ASE light, and at the same time, noise superposed on a signal light can be reduced by arranging the laser resonator as a system different from the system through which the signal light passes.

Figure 19:
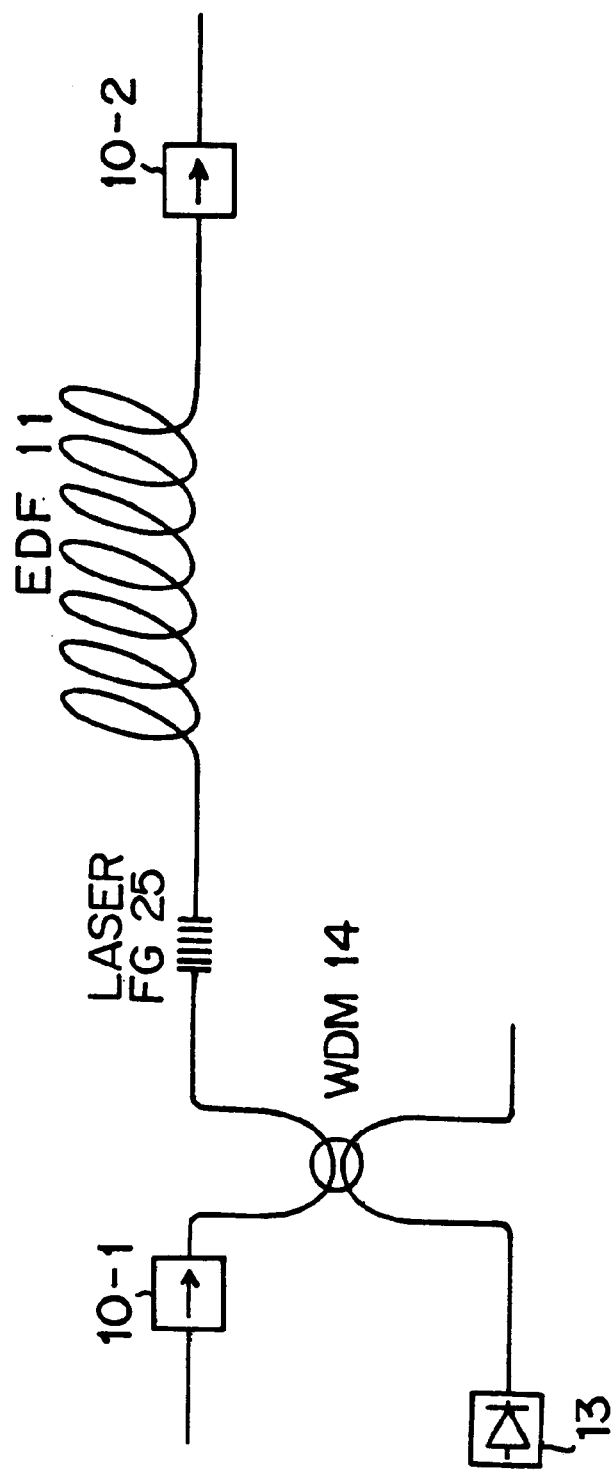
FIG. 19 shows the configuration of a seventh preferred embodiment according to the present invention.

FIG. 19 shows the configuration of a seventh preferred embodiment according to the present invention.

Here, not a laser oscillator that adopts a pair of FBGs and an EDF, but a marketed laser FG (Fiber Grating) is used. Since the laser FG produces laser oscillation on its own, the same operation as that of the laser resonator into which the pair of FBGs and the EDF are combined can be obtained solely with this laser FG, as in the above described preferred embodiment. The position at which the laser FG 25 is arranged may be between a WDM coupler 14 and an EDF 11, or between an isolator 10-1 and the WDM coupler 14.

Figure 20:
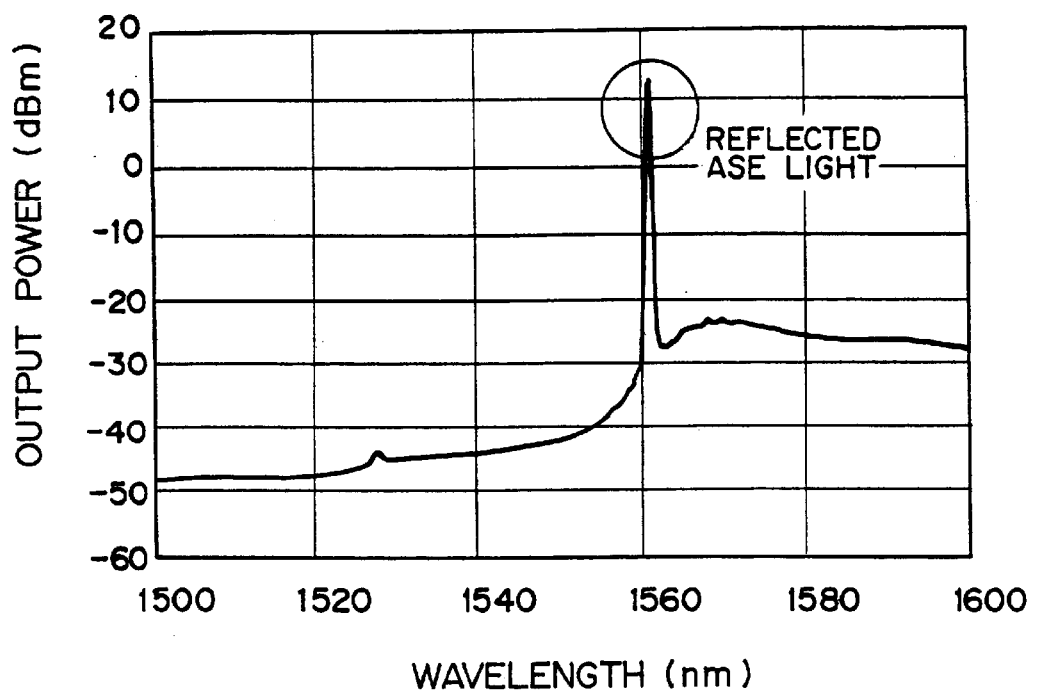
FIG. 20 shows the spectrum of output power at an output end of an EDF according to the preferred embodiment, which implements a configuration in which only an ASE is reflected, according to the preferred embodiment.

FIG. 20 shows an output power spectrum at the output end of the EDF in the preferred embodiment implementing the configuration where an ASE light is only reflected.

In this case, a reflected ASE light is shown as alight having a 1560-nm wavelength, and the output power is high on the long wavelength side of the reflected ASE light. That is, the gain is proved to be large. However, as also shown in this figure, several small peaks appear, which proves an occurrence of ASE noise. Consequently, the operations of the amplifier becomes unstable.

Figure 21:
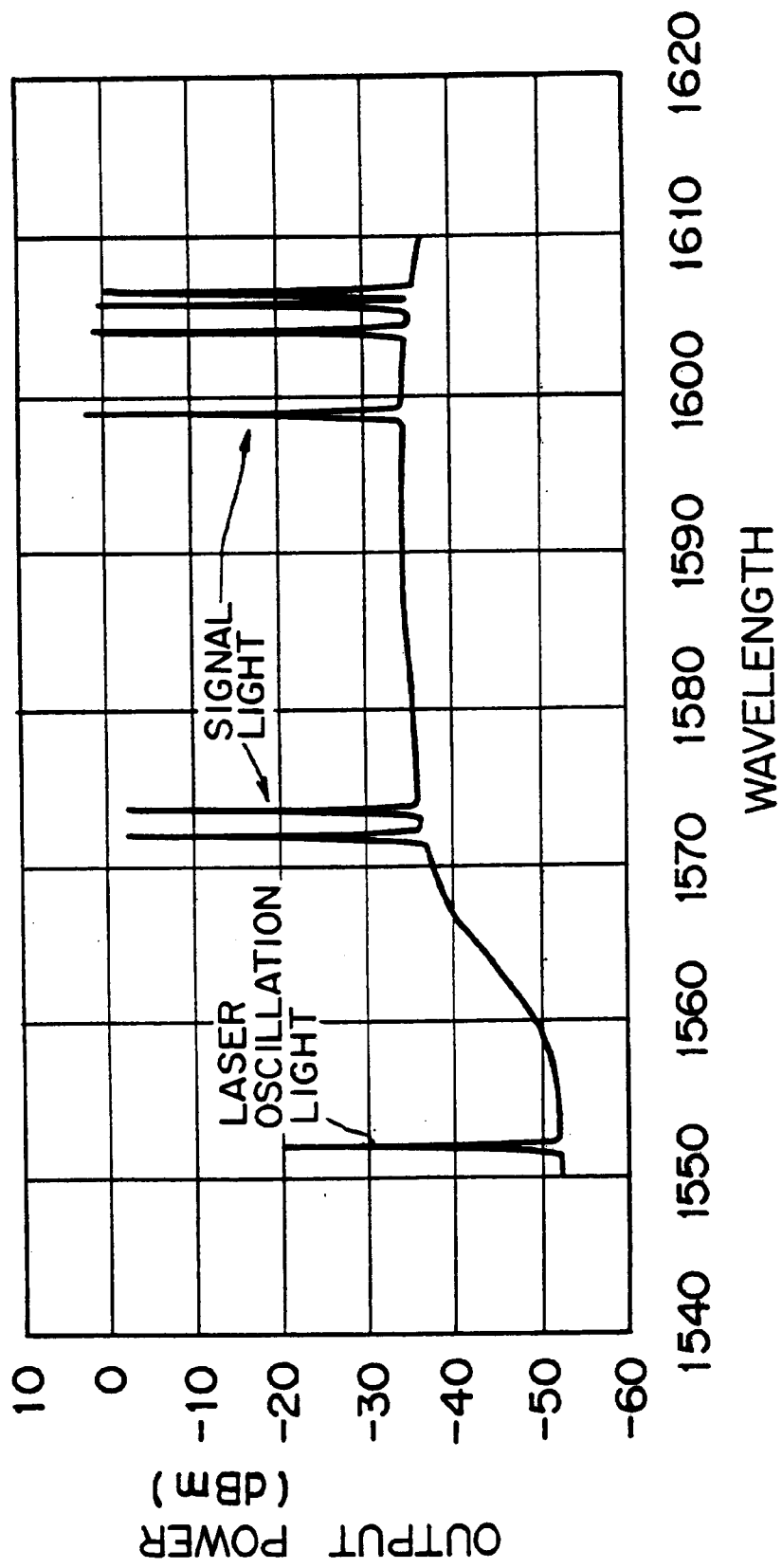
FIG. 21 shows the state of the output power at the output end of the EDF when a laser resonator is built into as in the preferred embodiment shown in FIG. 16.

FIG. 21 shows the state of the output power at the output end of the EDF in the case where the laser resonator is formed as in the preferred embodiment shown in FIG. 16.

As shown in this figure, the peak of a laser oscillation light appears in the neighborhood of a 1550-nm wavelength, and peaks of signal lights appear on the long wavelength side of the laser oscillation light. As is known from this figure, the spectrum wholly arises, and a gain becomes large on the long wavelength side of the laser oscillation light. Unlike FIG. 20, small peaks representing noise do not appear, which proves the stable operations of the amplifier.

Figure 22:
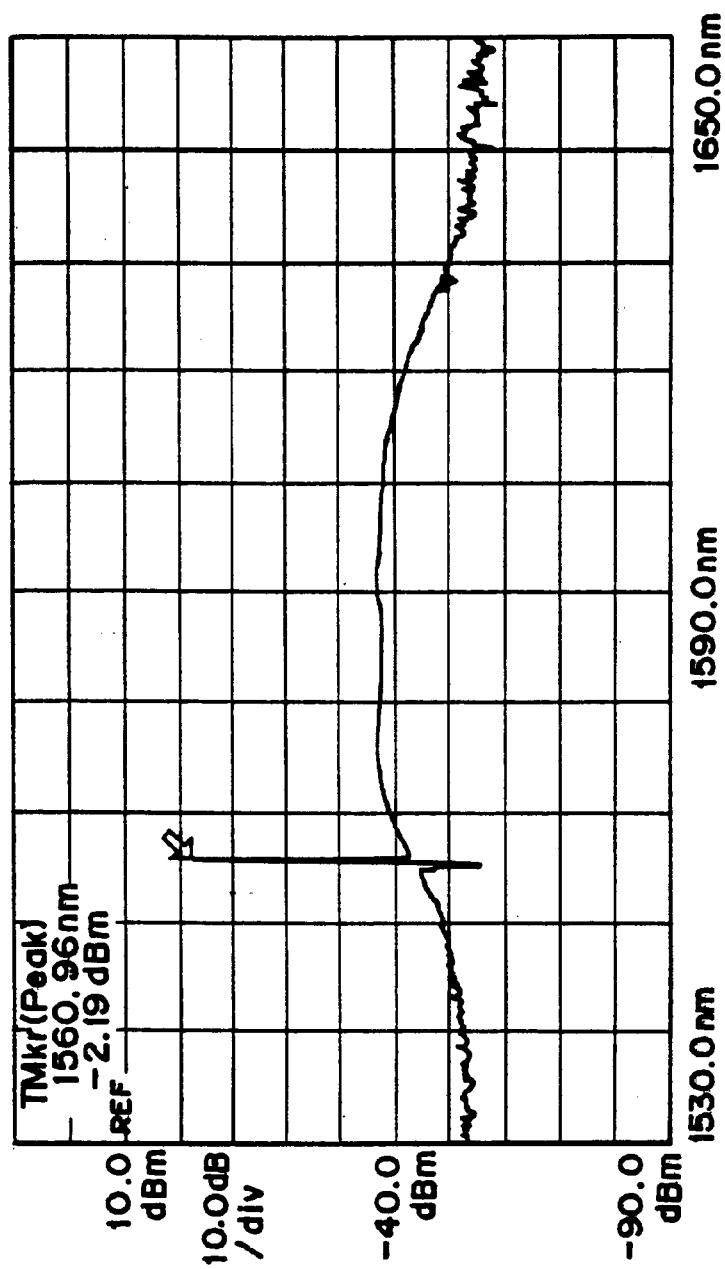
FIG. 22 shows the state of the output power at the output end of the EDF according to the preferred embodiment shown in FIG. 17.

FIG. 22 shows the state of the output power at the output end of the EDF in the preferred embodiment shown in FIG. 17.

It is known from this figure that the peak of a laser oscillation light appears in the neighborhood of a 1560-nm wavelength. The reason why the spectrum nearby to this peak falls is that the EDF generating an ASE light itself forms part of the laser resonator. Therefore, the optical energy of this portion is consumed, forming the peak of the laser oscillation light. As is known also from this figure, the long wavelength side of the laser oscillation light is flat. Therefore, it is proved that the gain is high, and at the same time, a characteristic without noise is obtained.

According to the present invention, ASE power generating in an EDF within an optical amplifier is effectively used, thereby suppressing gain deviation of a signal light having a long wavelength in an L-band EDFA.

What is claimed is:

1. An optical fiber amplifier, comprising:
    an amplifying unit, which is doped with a rare-earth element, amplifying a signal light in a wavelength band; and
    an ASE returning unit returning, to said amplifying unit, a range of ASE light having a wavelength that is longer than a wavelength with which ASE light occurs with a maximum efficiency, and shorter than the wavelength band, among ASE lights occurring when the signal light is amplified, ASE light outside of the range not being returned by the ASE returning unit, wherein the ASE light returned by the ASE returning unit is returned in a backward direction along a path traveled by the ASE light to the ASE returning unit.

2. The optical fiber amplifier according to claim 1, wherein said amplifying unit is an erbium-doped fiber.

3. The optical fiber amplifier according to claim 1, wherein the wavelength band is L-band.

4. The optical fiber amplifier according to claim 1, wherein said ASE returning unit is a reflection filter reflecting a predetermined wavelength.

5. The optical fiber amplifier according to claim 1, wherein said ASE returning unit is an optical resonator resonating an ASE light.

6. The optical fiber amplifier according to claim 5, wherein the optical resonator comprises a pair of light reflecting units, and an optical amplifying medium arranged between the pair.

7. The optical fiber amplifier according to claim 5, wherein the optical resonator is a laser fiber grating.

8. The optical fiber amplifier according to claim 5, wherein the optical resonator comprises:
   amplifying units, and
   a light reflecting unit arranged between the amplifying units.

9. The optical fiber amplifier according to claim 5, wherein the optical resonator is arranged as a system different from a transmission system of the signal light, and optically coupled by the transmission system and a coupler.

10. The optical fiber amplifier according to claim 6, wherein said pair of light reflecting units are fiber gratings.

11. A signal light amplifying method, comprising:
   amplifying a signal light in a wavelength band by using an amplifying medium, which is doped with a rare-earth element, ASE lights occurring and traveling along a path out of the amplifying medium as a result of said amplifying; and
   returning as a pump light to the amplifying medium a range of ASE light having a wavelength that is longer than a wavelength with which ASE light occurs with a maximum efficiency, and shorter than the wavelength band, among ASE lights occurring as a result of said amplifying, light outside of the range not being returned, the returned ASE light being returned in a backward direction along the path.

12. The signal light amplifying method according to claim 11, wherein an erbium-doped fiber is used in the amplifying step.

13. The signal light amplifying method according to claim 11, wherein the wavelength band is L-band.

14. The signal light amplifying method according to claim 11, wherein an ASE light is used as a pump light in the amplifying step by using a reflection filter reflecting a predetermined wavelength in the step where the ASE light is returned as the pump light.

15. The signal light amplifying method according to claim 11, wherein an optical resonator resonating an ASE light is used in the step where the ASE light is returned as the pump light.

16. The signal light amplifying method according to claim 15, wherein the optical resonator comprises:
   a pair of light reflecting units, and
   an optical amplifying medium arranged between the pair.

17. The signal light amplifying method according to claim 15, wherein the optical resonator is a laser fiber grating.

18. The signal light amplifying method according to claim 15, wherein the optical resonator comprises:
   amplifying media in the amplifying step, and
   a light reflecting unit arranged between the amplifying media.

19. The signal light amplifying method according to claim 15, wherein the optical resonator is arranged as a system different from a transmission system of the signal light, and optically coupled by the transmission system and a coupler.

20. The signal light amplifying method according to claim 16, wherein the pair of light reflecting units are fiber gratings.

21. An optical fiber amplifier, comprising:
   an amplifying unit, which includes an optical fiber doped with a rare-earth element as a amplifying medium, amplifying a signal light in a wavelength band, ASE lights thereby occurring and traveling along a path out of the amplifying medium; and
   an ASE returning unit returning, to said amplifying unit, a range of ASE light having a wavelength that is longer than a wavelength at which the optical fiber exhibits a highest average amplification gain and shorter than the wavelength band among the occurring ASE lights, so that ASE light outside of the range is not returned by the ASE returning unit, the returned ASE light being returned in a backward direction along the path.

22. An apparatus comprising:
   an optical fiber doped with a rare-earth element and provided with pump light so that a signal light in a wavelength band is amplified as the signal light travels through the optical fiber, thereby generating amplified spontaneous emission (ASE) in the optical fiber which propagates backwards out of the optical fiber along an ASE travel path; and
   a reflector reflecting a wavelength range of the backwards propagating ASE back into the optical fiber in a reverse direction along the ASE travel path, the wavelength range having (a) a shortest wavelength equal to or longer than a wavelength at which a maximum gain occurs as determined by an inversion population ratio along the optical fiber and (b) a longest wavelength shorter than a shortest wavelength in the wavelength band, the reflector thereby not reflecting ASE outside of the wavelength range.

23. An apparatus as in claim 22, wherein the rare-earth element is erbium.

24. An apparatus as in claim 22, wherein the wavelength band is L-band.

25. An apparatus as in claim 22, wherein the reflector is a reflection filter.

26. An apparatus as in claim 22, further comprising an optical resonator resonating the reflected ASE and including the reflector.

27. An apparatus as in claim 22, wherein said reflector is a first reflector, the apparatus comprising a second reflector which operates with the first reflector to form an optical resonator resonating the reflected ASE.

28. An apparatus comprising:
   an optical fiber doped with a rare-earth element and provided with pump light so that a signal light in a wavelength band is amplified as the signal light travels through the optical fiber, thereby generating amplified spontaneous emission (ASE) in the optical fiber which propagates backwards out of the optical fiber along an ASE travel path; and
   means for reflecting a wavelength range of the backwards propagating ASE back into the optical fiber in a reverse direction along the ASE travel path, the wavelength range having (a) a shortest wavelength equal to or longer than a wavelength at which maximum gain occurs as determined by an inversion population ratio along the optical fiber and (b) a longest wavelength shorter than a shortest wavelength in the wavelength band, said means thereby not reflecting ASE outside of the wavelength range.

29. A method comprising:
   providing a rare-earth element doped optical fiber with pump light so that a signal light in a wavelength band is amplified as the signal light travels through the optical fiber, thereby generating amplified spontaneous emission (ASE) in the optical fiber which propagates backwards out of the optical fiber along an ASE travel path; and
   reflecting a wavelength range of the backwards propagating ASE back into the optical fiber in a reverse direction along the ASE travel path, wherein the wavelength range has (a) a shortest wavelength equal to or longer than a wavelength at which maximum gain occurs as determined by an inversion population ratio along the optical fiber and (b) a longest wavelength shorter than a shortest wavelength in the wavelength band, said reflecting thereby not reflecting ASE outside of the wavelength range.

30. An apparatus comprising:

an optical fiber doped with a rare-earth element and provided with pump light so that a signal light in L wavelength band is amplified as the signal light travels through the optical fiber, thereby generating amplified spontaneous emission (ASE) in the optical fiber which propagates backwards out of the optical fiber along an ASE travel path; and a reflector reflecting a wavelength range of the backwards propagating ASE back into the optical fiber in a reverse direction along the ASE travel path, wherein the wavelength range is limited to wavelengths equal to or longer than approximately 1545 nm and shorter than 1565 nm.

31. An apparatus as in claim 30, wherein all the ASE reflected by the reflector has a wavelength equal to or shorter than 1560 nm.

32. An apparatus as in claim 30, wherein the rare-earth element is erbium.

33. An apparatus as in claim 31, wherein the rare-earth element is erbium.

34. An apparatus comprising:

an erbium optical fiber provided with pump light so that a signal light in L wavelength band is amplified as the signal light travels through the optical fiber, thereby generating amplified spontaneous emission (ASE) in the optical fiber which propagates backwards out of the optical fiber along an ASE travel path; and means for reflecting a wavelength range of the backwards propagating ASE back into the optical fiber in a reverse direction along the ASE travel path, wherein the wavelength range is limited to wavelengths equal to or longer than approximately 1545 nm and shorter than 1565 nm.

35. An apparatus as in claim 34, wherein all the ASE reflected by the reflector has a wavelength equal to or shorter than 1560 nm.

36. A method comprising:

providing a rare-earth element doped optical fiber with pump light so that a signal light in a wavelength band is amplified as the signal light travels through the optical fiber, thereby generating amplified spontaneous emission (ASE) in the optical fiber which propagates backwards out of the optical fiber along an ASE travel path; and reflecting all backwards propagating ASE within a wavelength range back into the optical fiber in a reverse direction along the ASE travel path, wherein the wavelength range has (a) a shortest wavelength equal to or longer than a wavelength at which maximum gain occurs as determined by an inversion population ratio along the optical fiber and (b) a longest wavelength shorter than a shortest wavelength in the wavelength band, said reflecting thereby not reflecting ASE outside of the wavelength range.

37. An apparatus comprising:

a rare-earth element doped optical fiber provided with pump light so that a signal light in a wavelength band is amplified as the signal light travels through the optical fiber, thereby generating amplified spontaneous emission (ASE) in the optical fiber which propagates backwards out of the optical fiber along an ASE travel path; and a reflector reflecting all backwards propagating ASE within a wavelength range back into the optical fiber in a reverse direction along the ASE travel path, wherein the wavelength range has (a) a shortest wavelength equal to or longer than a wavelength at which maximum gain occurs as determined by an inversion population ratio along the optical fiber and (b) a longest wavelength shorter than a shortest wavelength in the wavelength band, the reflector not reflecting ASE outside of the wavelength range.

38. An apparatus comprising:

a rare-earth element doped optical fiber provided with pump light so that a signal light in a wavelength band is amplified as the signal light travels through the optical fiber, thereby generating amplified spontaneous emission (ASE) in the optical fiber which propagates backwards out of the optical fiber along an ASE travel path; and means for reflecting all backwards propagating ASE within a wavelength range back into the optical fiber in a reverse direction along the ASE travel path, wherein the wavelength range has (a) a shortest wavelength equal to or longer than a wavelength at which maximum gain occurs as determined by an inversion population ratio along the optical fiber and (b) a longest wavelength shorter than a shortest wavelength in the wavelength band, said means not reflecting ASE outside of the wavelength range.

* * * * *